United States Patent [19]

Tani

[11] Patent Number: 5,301,257
[45] Date of Patent: Apr. 5, 1994

[54] NEURAL NETWORK
[75] Inventor: Jun Tani, Kanagawa, Japan
[73] Assignee: Sony Corporation, Tokyo, Japan
[21] Appl. No.: 915,462
[22] Filed: Jul. 16, 1992
[30] Foreign Application Priority Data
  Jul. 26, 1991 [JP] Japan .................. 3-209790
[51] Int. Cl.[5] ................................ G06F 15/18
[52] U.S. Cl. .......................... 395/11; 395/22; 382/14; 382/15
[58] Field of Search ............... 395/22, 23, 11; 382/14, 382/15
[56]  References Cited
  U.S. PATENT DOCUMENTS
  5,086,479  2/1992  Takenaga et al. ............ 395/22

Primary Examiner—Allen R. MacDonald
Attorney, Agent, or Firm—Limbach & Limbach

[57] ABSTRACT

To enable the pattern matching between a shifted input pattern and the standard pattern, a plurality of standard patterns are stored in a standard pattern associative memory network 12. A pattern shifted relative to the standard pattern is inputted to the input pattern network 11 and a restriction condition of when the input pattern is shifted relative to the standard pattern is stored in a coordinate associated network 14. In an association network 13, weights and biases are determined so that the respective units of the network 13 are activated most intensely when the input pattern and the standard pattern match correctly each other in response to the signals from the respective networks 11, 12, and 14.

2 Claims, 11 Drawing Sheets

AXIS COORDINATE ASSOCIATED NETWORK

ASSOCIATION NETWORK

ASSOCIATIVE MEMORY NETWORK

INPUT PATTERN NETWORK

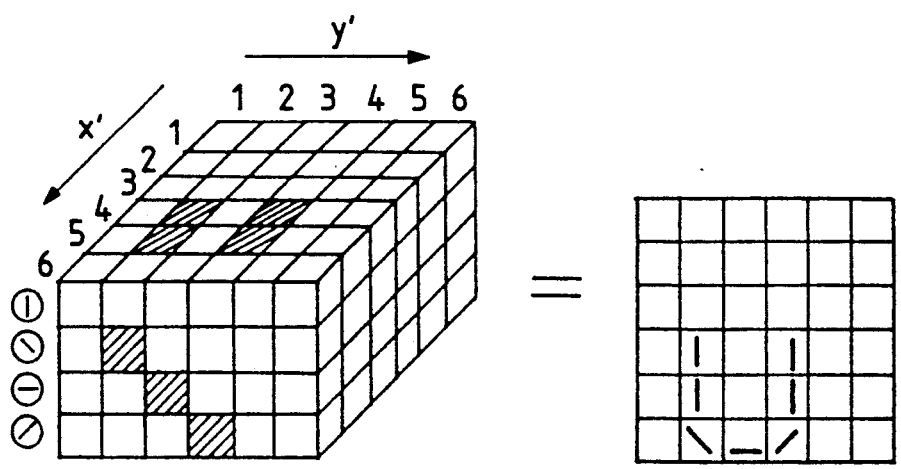

|  |  | a 1 | a 2 | b 3 | b 4 | c 5 | c 6 | c 7 | d 8 |
|---|---|---|---|---|---|---|---|---|---|
| a | 1' | ● | ○ | ○ | ○ | ○ | ○ | ○ | ○ |
| a | 2' | ○ | ● | ○ | ○ | ○ | ○ | ○ | ○ |
| a | 3' | ○ | ○ | ○ | ○ | ○ | ○ | ○ | ○ |
| b | 4' | ○ | ○ | ● | ○ | ○ | ○ | ○ | ○ |
| b | 5' | ○ | ○ | ○ | ● | ○ | ○ | ○ | ○ |
| c | 6' | ○ | ○ | ○ | ○ | ● | ○ | ○ | ○ |
| c | 7' | ○ | ○ | ○ | ○ | ○ | ○ | ● | ○ |
| d | 8' | ○ | ○ | ○ | ○ | ○ | ○ | ○ | ● |

DASHED L : NEG CPLG
SOLID L : POS CPLG

FIG. 16
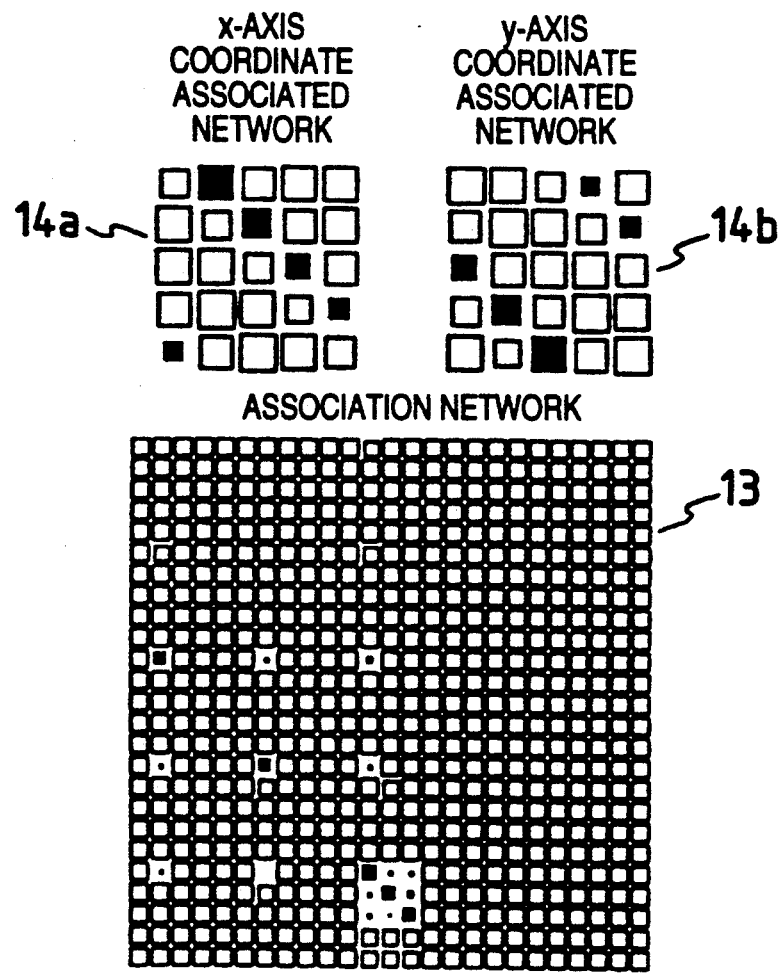
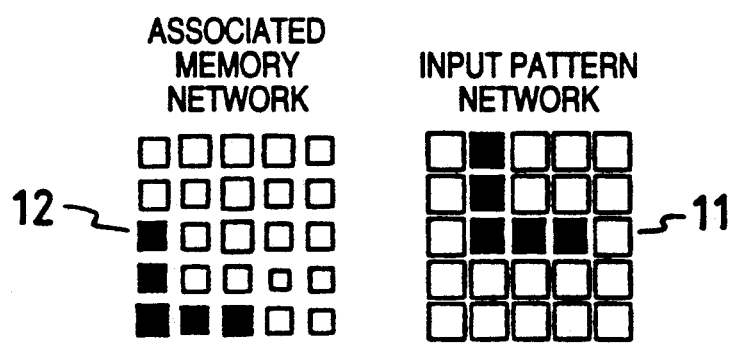

FIG.17(a)
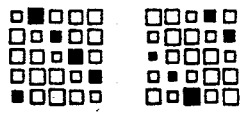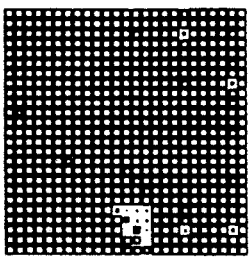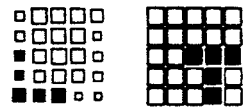
t=200
FIG.17(b)
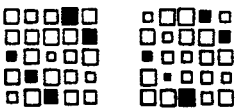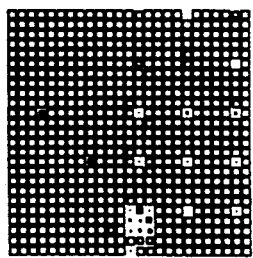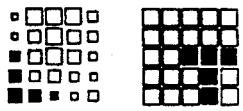
t=1799
FIG.17(c)
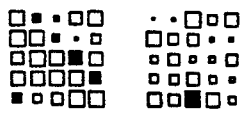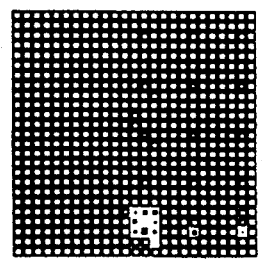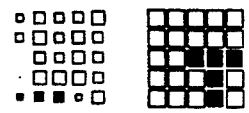
t=3899
FIG.17(d)
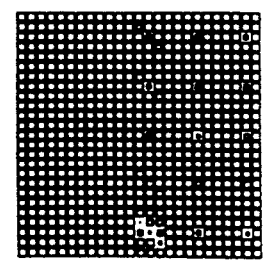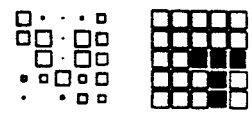
t=4139
FIG.17(e)
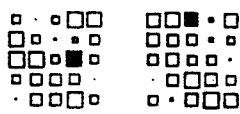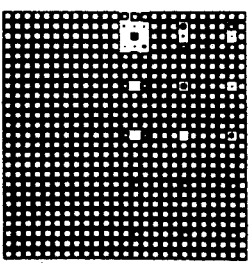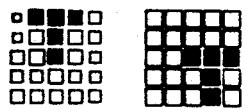
t=4999
FIG.17(f)
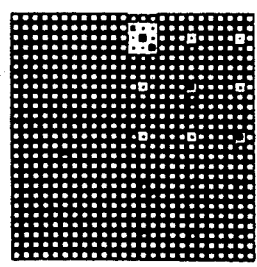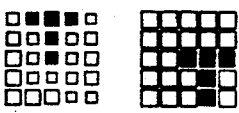
t=5300
FIG.17(g)
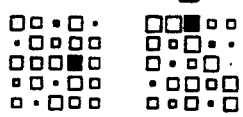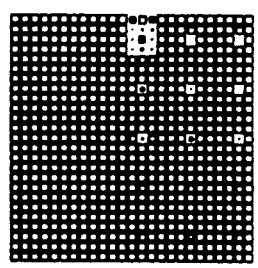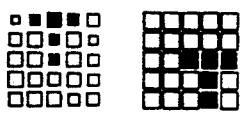
t=6300
FIG.17(h)
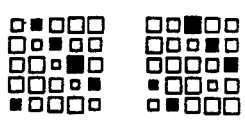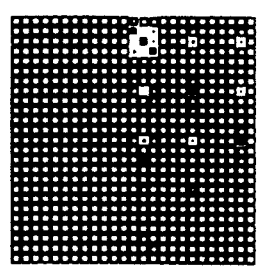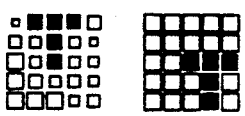
t=6899

FIG. 18
AXIS COORDINATE
ASSOCIATED NETWORK
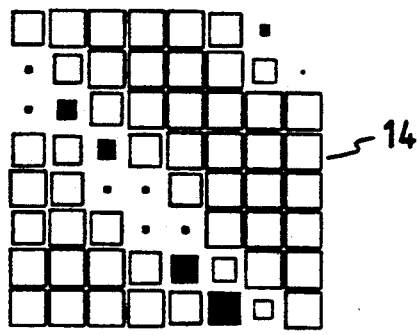
ASSOCIATION NETWORK
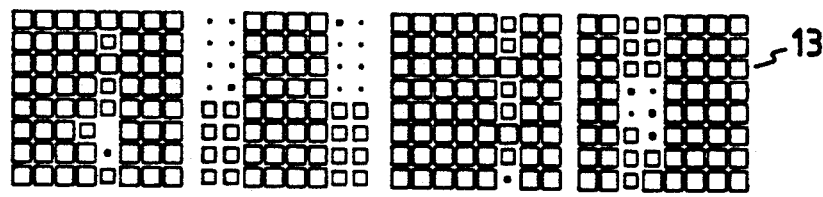
ASSOCIATIVE
MEMORY
NETWORK
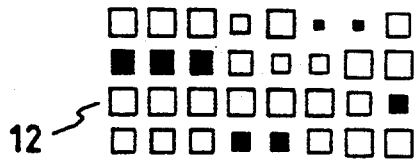
INPUT PATTERN
NETWORK
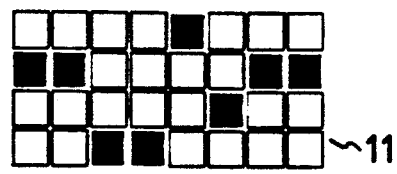
FIG. 20
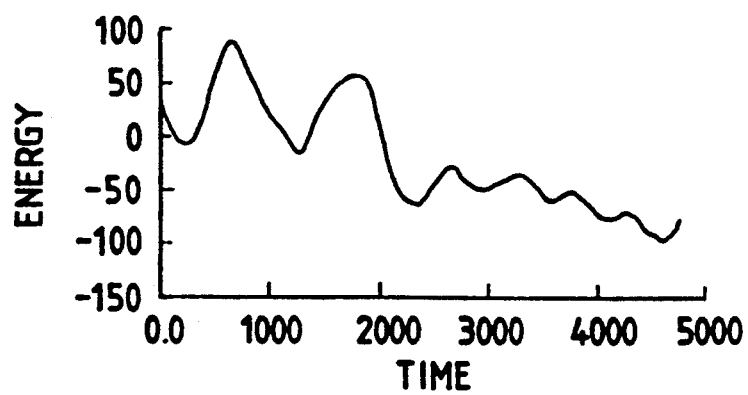

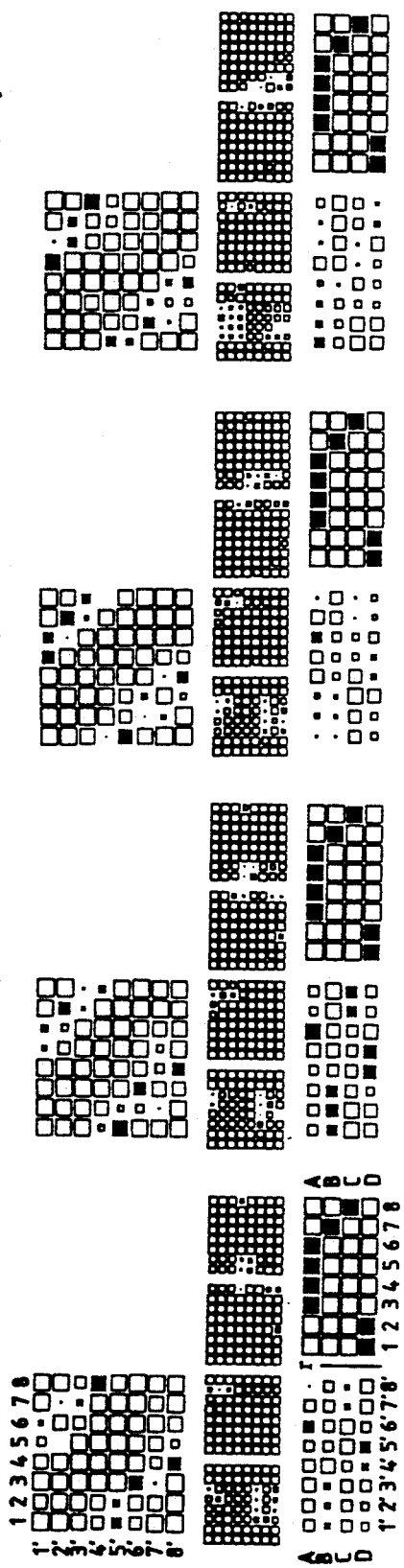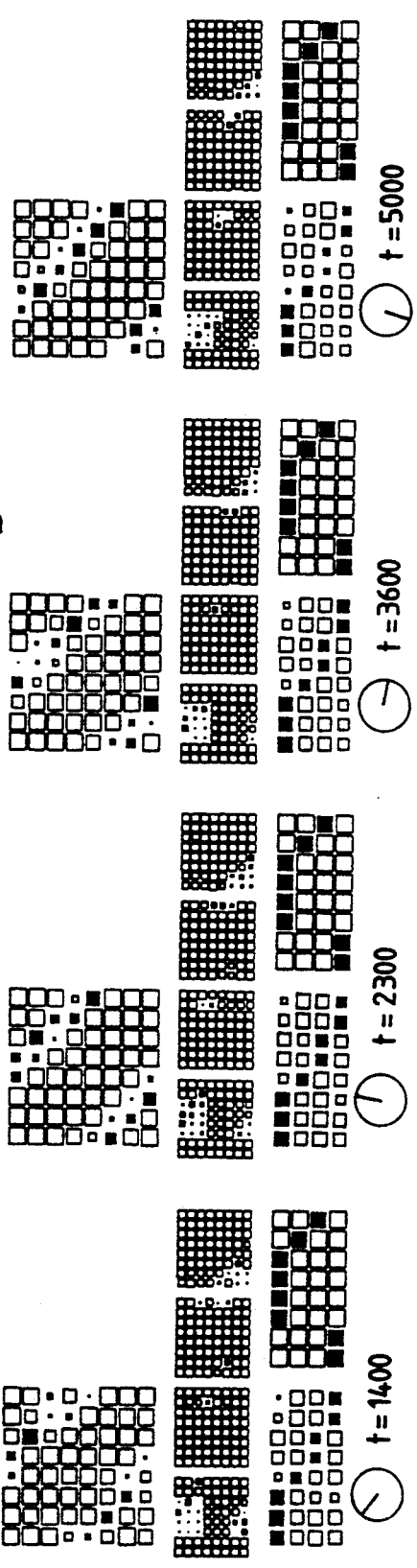

NEURAL NETWORK

BACKGROUND OF THE INVENTION

1. Field of the Invention

The present invention relates to a neural network in which nerve cell networks of a living thing are applied to information processing.

2. Description of the Prior Art

An associative memory neural network is now being adopted for pattern matching of image data or speech data. FIG. 1(a) is a typical illustration of the pattern matching of a character A. As shown in FIG. 1(a), even if a pattern of the character A is inputted in a state in which a noise signal is superimposed upon a part of the character, the neural network can recollect a standard pattern associated with the input pattern. That is, even where the input pattern is somewhat defective due to noises, it is possible to recognize a correct standard pattern therefor. That is, the associative memory neural network has such advantages that it excels in collation capability based only on a partial input pattern and is therefore robust against noises.

However, as shown in FIG. 1(b) for example, the conventional neural network has had the problem that even if a pattern identical with the standard pattern is inputted, when the inputted pattern is offset from the standard position, it cannot recollect the standard pattern.

SUMMARY OF THE INVENTION

With the above problem in mind, therefore, it is a primary object of the present invention to provide a neural network which can recollect a correct standard pattern even when an inputted pattern is offset from the standard position.

To achieve the above-mentioned object, the neural network according to the present invention comprises: a standard pattern associative memory network 12 having at least one standard pattern stored therein; an input pattern network 11 for receiving any given input pattern; a coordinate associated network 14 for storing a predetermined restriction condition; and an association network 13 which receives as inputs signals from the above-mentioned three networks and which becomes active in accordance with the matching status between the input pattern and the standard pattern.

Further, the restriction condition stored in the coordinate associated network 14 is so determined as to accept a matching deflection.

In the neural network according to the present invention, the matching status in the association network 13 is activated in response to the signals supplied from the standard pattern associative memory network 12, the input pattern network 11 and the coordinate associated network 14. Therefore, it is possible to recollect a correct standard pattern even when the input pattern is offset in position from the standard pattern.

Further, since the restriction condition in the coordinate associated network 14 is so determined as to accept any matching deflection, it is possible to recollect the correct standard pattern even when the input pattern is expanded or contracted in a non-linear fashion.

BRIEF DESCRIPTION OF THE DRAWINGS

FIG. 7 is an illustration of the network units required when a word composed of six characters of 4 different kinds is pattern-matched;

FIG. 8 is an illustration of an inflammation status on a 6×6 dot pattern network;

FIG. 9 is an illustration of the network units in which four directions of an edge is represented as symbol elements instead of a dot pattern;

FIG. 10 is a table listing operators used when the coupling weights and biases by the correlation learning are decided;

FIG. 11 is an illustration of an input pattern;

FIG. 16 is an illustration of he configuration of the neural network with which an experiment was conducted on the matching of a 5×5 pixel image;

FIGS. 17(a) to (h) are illustrations of the pattern matching process by the neural network having the configuration shown in FIG. 16;

FIG. 18 is an illustration of the configuration of the neural network with which an experiment was conducted on the matching of a shifted input pattern involving a non-linear expansion and contraction;

FIGS. 19(a) to (h) are illustrations of a pattern matching process by use of the neural network shown in FIG. 18; and FIG. 20 is a graph showing changes in energy with a lapse of time at various steps of the process shown in FIGS. 19(a) to (h).

DETAILED DESCRIPTION OF THE PREFERRED EMBODIMENTS

One embodiment of the neural network according to the present invention will be described hereinbelow with reference to the attached drawings.

1. Collation of Shifted Pattern with Standard Pattern

The matter to be processed will be described first by using a simple one-dimensional pattern as an example.

It is assumed that the following three standard symbol string patterns be stored.

Pattern 1: a a b c d
Pattern 2: a c b d d
Pattern 3: a d d c b

Input patterns are given in the forms in which they are shifted from the symbol strings of these standard patterns. Therefore, if the shifted input patterns can be collated with the original (non-shifted) standard patterns, it will be possible to recollect the standard patterns on the bases of the input patterns.

For example, assume that the symbol string of "c d a a b" be collated with the standard patter 1 and the symbol string of "c b d d a "be collated with the standard pattern 2. In this case, there exists a restriction relationship between the coordinate system of the shifted input pattern and the coordinate system of the standard pattern.

Figure 3A:
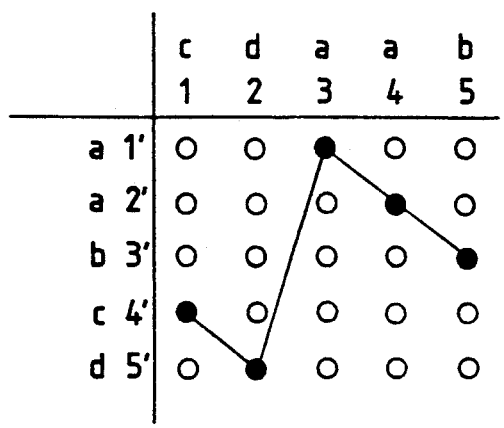
FIGS. 3(a) and (b) are illustrations of a matching status where an input pattern is shifted from a standard pattern.
Figure 3B:
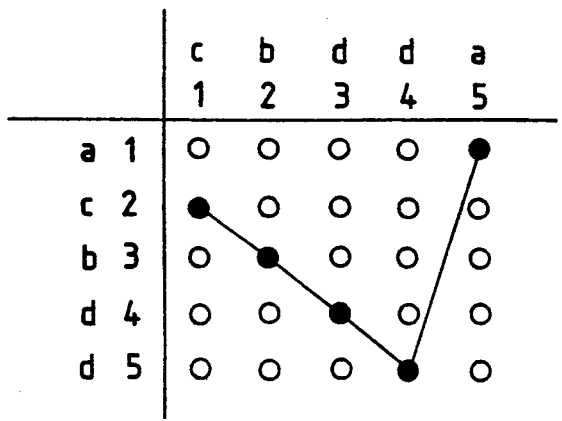

In other words, the corresponding relationship between the coordinate system of the input pattern "c d a a b" and that of the standard pattern 1 can be represented as shown in FIG. 3(a) and the corresponding relationship between the coordinate system of the input pattern "c b d d a" and that of the standard pattern 2 can be represented as shown in FIG. 3(b).

In the node matrices shown in FIGS. 3(a) and (b), the relationship between i (input pattern coordinates) and j (standard pattern coordinates) of a corresponding node a (i, j) can be expressed on the basis of the shift rate s of the input pattern as follows:

$$i = j + s (j + s \leq m) \qquad (1)$$
$$= j + s - m (j + s > m)$$

where m denotes the length of the symbol string. The above-mentioned restriction relationship is equivalent to the following restriction relationship:

(2) If the node a (i, j) is the corresponding node, a ( shift (i), shift (j) ) is also the corresponding node, provided that shift (i)=i+1(i+1≦m)

$$= 1(i+1 > m).$$

When a shifted input pattern is given, the problem as to which standard pattern the input pattern should be collated with is equivalent to the finding of as standard pattern which can satisfy the above-mentioned restriction by forming associated node matrices between the input pattern and the respective standard patters. This concept can be applied to a case where the dimension is further expanded. For instance, in the case of the shift in the x- and y-directions on the two kinds of dimensional image information, the associated matrices in the x- and y-directions may be formed and the above-mentioned restriction may be added to those associated matrices.

2. Solution by Neural Network

Figure 1A:
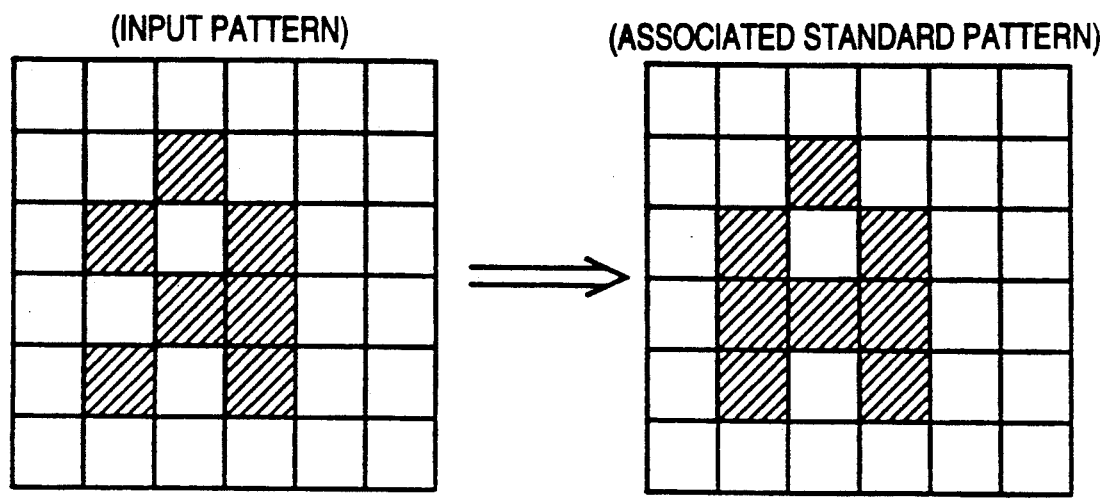
FIGS. 1(a) and (b) are typical illustrations of a problem involved in the pattern matching by a conventional neural network.
Figure 1B:
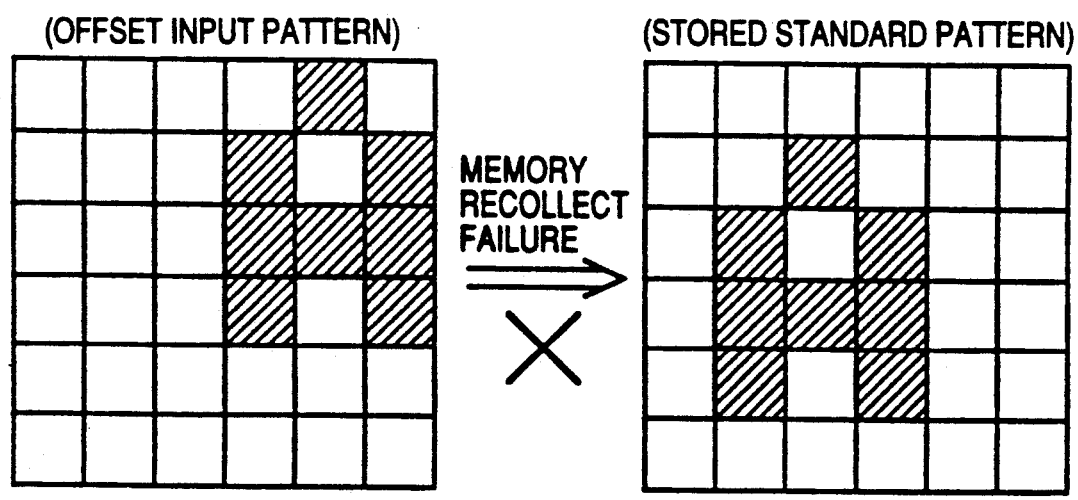
Figure 2:
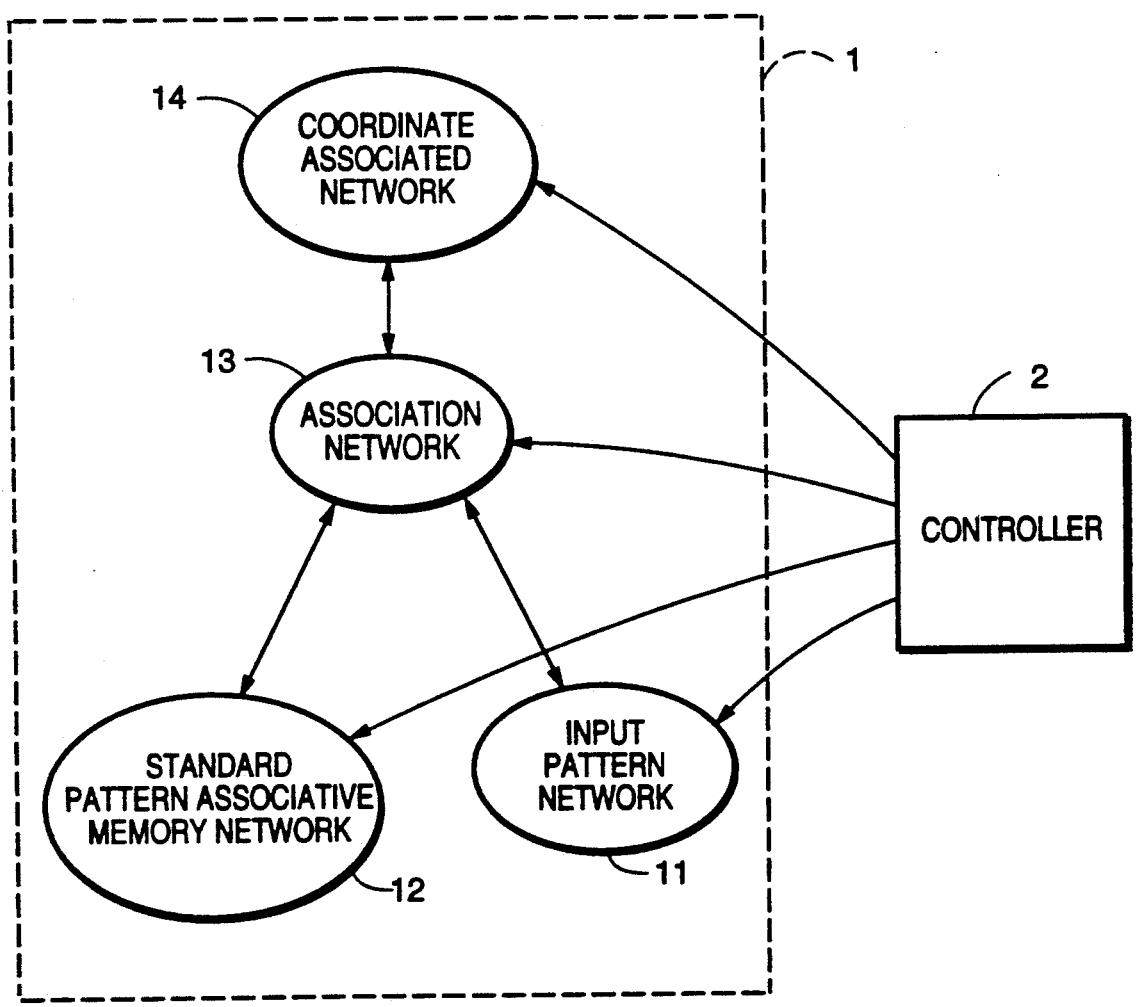
FIG. 2 is a block diagram showing the configuration of one embodiment of a neural network according to the present invention.

FIG. 2 is a block diagram showing a configuration of one embodiment of the neural network according to the present invention which can satisfy the above-mentioned conditions. In this embodiment, the neural network 1 is composed of an input pattern network 11, a standard pattern associative memory network 12, an association network 13 and a coordinate associated network 14. The weights and the biases of the respective networks are determined by a controller 2.

In FIG. 2, any given input patterns are inputted to the input pattern network 11. A plurality of standard patterns to be collated with the input patterns are stored in the standard pattern associative memory network 12. The restriction conditions (described later in more detail) are stored in the coordinate associated network 14. The above-mentioned storages are executed by setting the coupling weights or biases of the mutually-coupled networks to appropriate values. In the association network 13, the signals supplied by the above-mentioned three networks are associated. When the input pattern correctly matches the standard pattern, the weight and the bias thereof are determined so that the respective associated units of the association network 13 can be activated most intensely. In other words, the respective module networks 11 to 14 share the roles, that is, the respective restrictions, and complete the pattern matching when the energy is minimized through the energy minimization process, or when all the restrictions are satisfied. Under these conditions, the standard pattern to be collated with the input pattern is recollected by the standard pattern associative memory network 12.

3. Coordinate Associated Network

The number of the coordinate associated networks 14 is determined so as to correspond to the number of the dimensions of the directions in which the input pattern is shifted. For instance, in the case of speech recognition, since a sift in only the time axis direction is to be taken into account, only one coordinate associated network in the time axis direction can answer the purpose. However, in the case of the character recognition, since two shifts in the two x- and y-directions are to be taken into account, two coordinate associated network in the two x- and y-directions are required.

Figure 4:
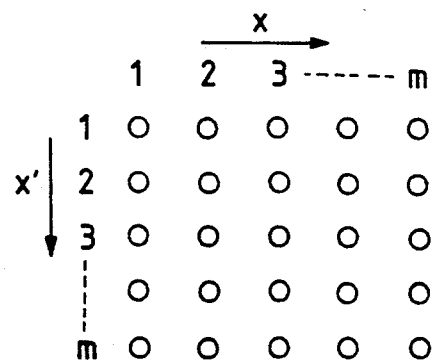
FIG. 4 is an illustration of a arrangement of network units when the x direction is quantized into m-pieces.

Now, let us consider one coordinate associated network for a certain coordinate axis x. If the x direction is quantitized into m pieces, the network has units of m×m pieces. These units are arranged in the form of a matrix as shown in FIG. 4, where x denotes the input coordinates and x' denotes the standard storage coordinates. In this network, therefore, under the condition that the inflammation statuses of the respective units (shown by black dots in FIGS. 5, 6 and etc.) represent the associated relationship of the coordinates, the restrictions shown by the above-mentioned items (1) and (2) can be buried in the network by setting the following coupling weights, for instance:

$W(i, j, i \oplus 1, j \oplus 1), W(i, j, i \ominus 1, j \ominus 1)$: Positive coupling
$W(i, j, i, k)$: Negative coupling, where $1 \leq k \leq m, k = j$
$W(i, j, k, j)$: Negative coupling, where $1 \leq k \leq m, k = i$ Here, the operator (+) is expressed as $$i(+)s = i + s \qquad (\text{if } i + s \leq m)$$
$$= i + s - m \qquad (\text{if } i + s > m)$$

and the operator (−) is expressed as $$i(-)s = i - s \qquad (\text{if } i - s \geq 1)$$
$$= i - s + m \qquad (\text{if } i - s < 1)$$

Further, the same bias of a predetermined value is added to the respective units.

Figure 5:
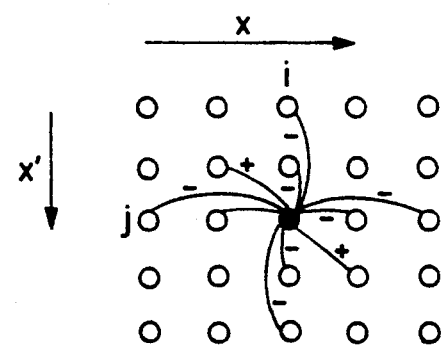
FIG. 5 is an illustration of the network units on which a restriction condition is added.
Figure 6A:
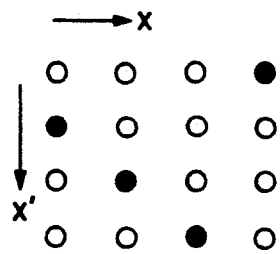
FIGS. 6(a) and (b) are illustrations of an inflammation status indicative of an acceptable shift in a coordinate system.
Figure 6B:
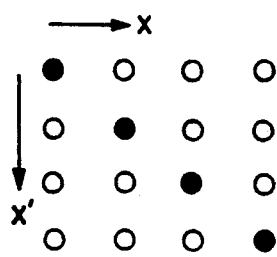

In the above expressions, when Unit (i, j) is noticed, the coupling relationship can be shown as in FIG. 5. Here, the positive coupling indicates the coupling by which the energy is decreased and the negative coupling indicates the coupling by which the energy is increased. By this coupling relationship, there is only one inflammation point in the same row or column and it becomes easy to arrange the inflammation points in the diagonal line direction (under these conditions, the energy of the network can be minimized). By providing the coupling as described above for the network and further by obtaining the stable inflammation statues of the units in accordance with the time expansion equation for the ordinary hop field network, for instance, it is possible to obtain the inflammation status indicative of the shift acceptance in the coordinate system as shown in FIGS. 6(a) and (b). FIG. 6 (b) represents the status where the matching is made at zero shift rate and FIG. 6 (a) represents the status where the matching is made at one-dot shift rate.

Hereinafter, the unit corresponding to x-th of the input pattern coordinate system and the x'-th of the standard storage coordinate system on the i-coordinate axis is indexed as Unit [x, x', i].

4. Standard Pattern Associative Memory Network

In the standard pattern associative memory network 12, there are stored standard patterns whose coordinates are not shifted. The basic structure of the network 12 of the present invention is substantially the same as that of the prior art associative memory network.

Here, assuming that the coordinates be of n dimensions, the respective axes i be quantitized into m pieces in the axial directions, respectively, and information on the coordinates be represented by a p-dimensional vector expressed by "0" and "1". Under these conditions, the network will be composed of units of m1. m2. . . . mn .p pieces. When the x-th on the i coordinates is indexed by xi, and the information represented by a vector is indexed by k, the k-th information at the points of [−x1, . . . xn] on the coordinates is assumed to be expressed by Unit [x1, . . . xn, k].

By way of example, a word (a character string) composed of six characters of 4 different kinds of {a, b, c, d} is taken into account. In this case, the coordinate is of one dimension, with p=4, and m1=6. As shown in FIG. 7, the word "a, b, b, c, d, d" is at "1" (inflammation) at Unit [1,1], Unit [2,2], Unit [3, 2], Unit [4,3], Unit [5,4], and Unit [6,4], and at "0" (non-inflammation) at the remaining units.

Let us consider a dot pattern on a two-dimensional plane as another example. In a 6×6 dot pattern, m1=6, m2−=−6, and p=1, so that the inflammation status is represented on the network, as shown in FIG. 8 (in which a character A is represented).

In the example shown in FIG. 8, if the four edge directions (horizontal, vertical, 45-degree inclination on the right side, 45-degree inclination on the left side) are expressed as symbol elements instead of the dot pattern, p−=−4, as shown in FIG. 9. In FIG. 9, the four layers correspond to the four directions, respectively.

It is possible to store a plurality of standard patterns in the network 12 on the basis of the ordinary correlation learning. The coupling weight and the coupling bias on the basis of the correlation learning are ordinarily determined in accordance with the following formulae:

$$Wij = \epsilon_1 \sum_{p=1}^{n} aip * ajp$$

$$bi = \epsilon_2 \sum_{p=1}^{n} \text{Sign}(aip)$$

where
- aip denotes the output value (0 or 1) of the unit i of the pattern p;
- n denotes the number of the total patterns;
- Wij denotes the coupling weight between units i and j;
- bi denotes the bias of the unit i;
- Sign denotes the positive or negative function:

$$\text{Sign}(x) = 1 \text{ if } x > 0$$
$$= -1 \text{ if } x \leq 0$$

Further, the operator * is shown in FIG. 10 as x * y.

Where the number of the patterns to be stored is large, it is considered to be effective to store the patterns in a Boltzmann-type network including an embedded unit in the same way as is described above.

Thus, in the standard pattern associative memory network 12 in which the standard patterns are stored, one stored pattern can be recollected when the energy drops to its minimum value from an appropriate initial status of an inflammation, in accordance with a time expansion algorithm for the ordinary hop field network.

5. Input Pattern Network

In the input pattern network 11, units are arranged in accordance with the coordinate dimensions and the information degrees of the input pattern. In the case of a dot pattern in which m-pieces are quantitized in the x and y directions, units of m x m x 1 pieces are required. Further, since this input pattern network 11 stores only the fixed input pattern therein, the units are not coupled with each other. The inflammation or the non-inflammation of the respective units are determined o the basis of the inputted pattern, and the above-mentioned status is kept throughout the pattern matching process. FIG. 11 shows the status where an input pattern of a character A is stored in the input pattern network 11 in which the respective units are indexed by Unit [x1, x2, . . . xn, k].

6. Association Network

The association network 13 is coupled with the respective modules of the coordinate associated network 14, the standard pattern associative memory network 12 and the input pattern network. Assuming that the pattern of n dimensions be quantitized into mi pieces in the directions of the respective coordinate axes i and further the information on the coordinates be represented by a p-dimensional vector, the association network 13 will be configured by the units of the number of (m1, m2, . . . mn)². p. Here, the respective units of the association network 13 are assumed to be indexed by Units [x1, x2, . . xn, x'1, x'2, x'n, k] where xi denotes the index of i coordinates of the input pattern coordinate system x'i denotes the index of the i coordinates of the standard pattern coordinate system and k denotes the index of the information vector.

The respective units are coupled with other modules as follows: Unit [x1, x2, ... xn, x'1, x'2, ... x'n, k] are positive-coupled with Unit [xi, x'i, i] of the coordinate associated network 14 of the coordinate axis i, Unit [x'1, x'2, .. x'n, k] of the standard pattern associative memory network 12, and Unit [x1, x2, .. xn, k] of the input pattern network 11. There exists no coupling in the units within the association network 13. Further, a negative bias of the same appropriate value is applied to each unit.

When the above couplings have been formed, a memory pattern corresponding to the input pattern is correctly recollected on the standard pattern associative memory network 14 and further the shift relationship between the two is correctly self-recollected on the coordinate associated network 14. In this case the respective corresponding units of the association network 13 are inflamed intensely, and the energy of the association network 13 is minimized. In the reverse viewpoint, the association network 13 itself is directed to its minimum energy condition and urges both the standard pattern associative memory network 12 and the coordinate associated network 14 to form a correct pattern associated with the input pattern.

Figure 12:
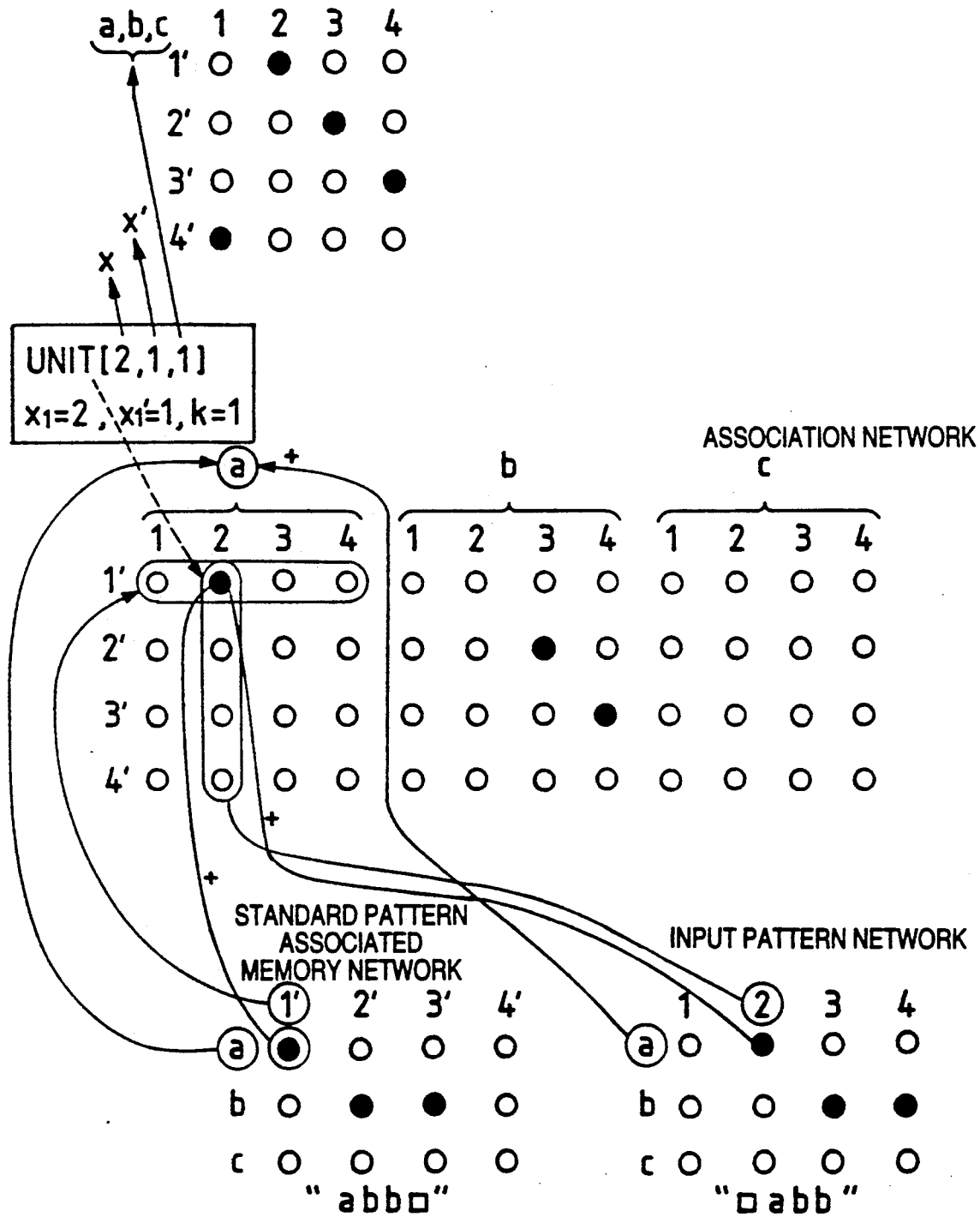
FIG. 12 is an illustration of the relationship between the respective units of the respective module networks of the neural network shown in FIG. 2.

The above operation will be described in further detail by taking an example. Consider, a character string composed of 4 characters (at maximum) of 3 different kinds. FIG. 12 shows a status where the input pattern "☐ a b b " is matched with the memory pattern "a b b ☐," where ☐ denotes a space. FIG. 12 shows the way how Unit [2, 1, 1] of the association network 13 is coupled to the networks of the other modules. The weight of this Unit [2, 1, 1] exists with respect to the corresponding units of the other three networks, and therefore there exists no coupling relationship between the other units in the association network 13. FIG. 12 shows the status where the input pattern is perfectly associated with the standard pattern and therefore the units of the association network 13 corresponding to the associated points are being inflamed.

Figure 13:
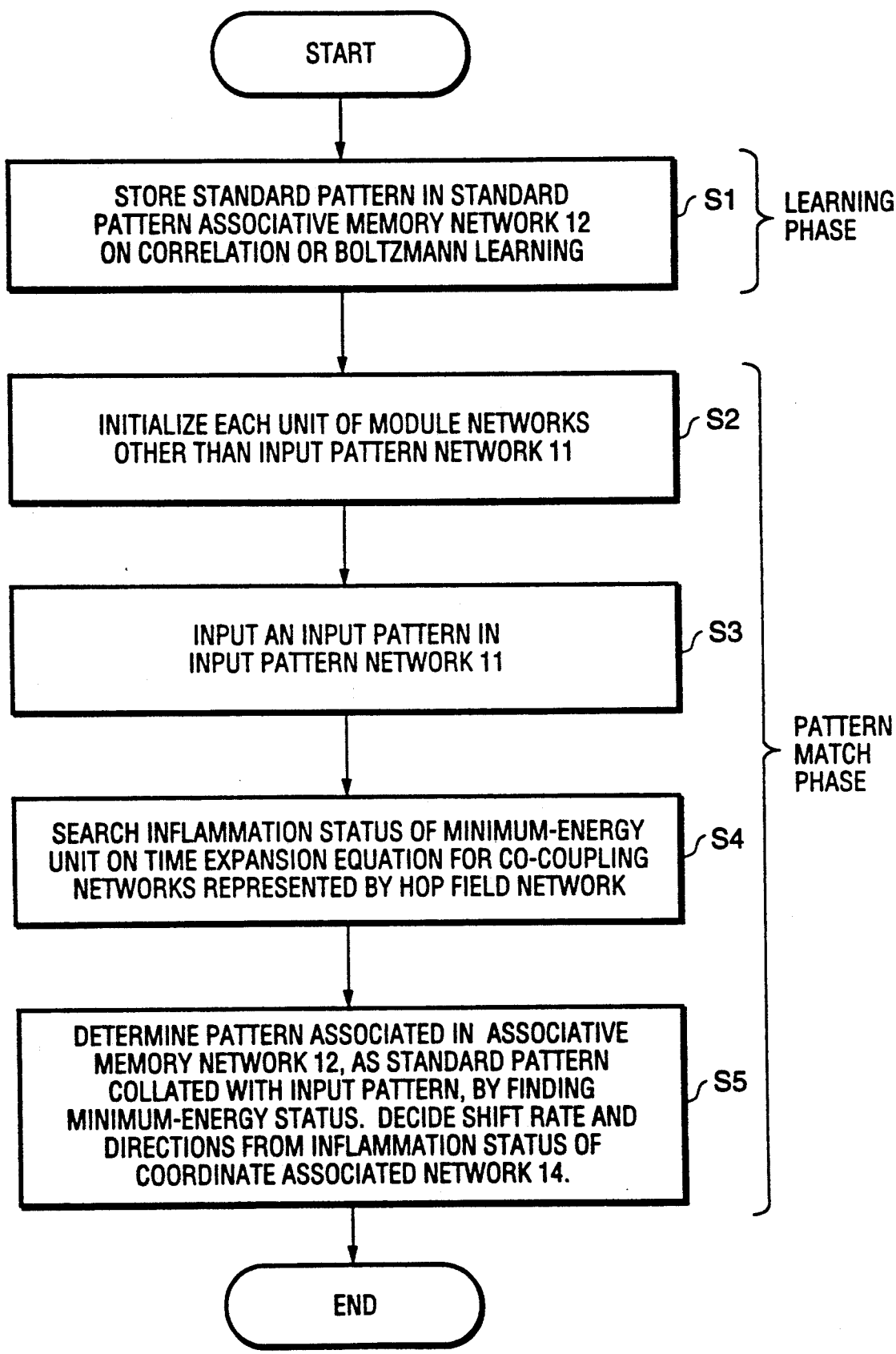
FIG. 13 is a flowchart showing a processing for executing a pattern matching by the embodiment shown in FIG. 2.

The pattern matching process with the neural network of the above-described structure may be expressed by a flow chart represented by FIG. 13 in which the processing sequence is composed of a learning phase of step S1 and a pattern match phase of steps S2 through S5.

In the step S1, standard patterns are stored in the standard pattern associative memory network 12 on the basis of the correlation learning or the Boltzmann machine learning. As already described, the memory processing is determined by providing weights between the units, and biases for the respective units. After the standard patterns have been stored in the standard pattern associative memory network 12 by learning, as described above, the following pattern matching process is executed in the succeeding steps of S2 though S5.

In more detail, in step S2, the values of the units of the respective networks other than the input pattern network 11 are initialized to appropriate values. Subsequently, in step S3, a predetermined pattern is inputted to the input pattern network 11. Further, in step S4, the inflammation status of the units of minimum energy is searched in accordance with a time expansion equation (described later in further details) for cocoupling-type networks represented by a hop field network. Further in step S5, when the status where the energy is minimum is found out, the pattern now recollected in the standard pattern associative memory network 12 becomes the standard pattern associated with the input pattern. In addition, it is possible to determine the shift rate and the shift directions on the basis of the inflammation status of the coordinate associated network 14.

The time expansion equation for the cocoupling-type network related to step S4 can be set as follows:

$$a_i(h+1) = 1 \quad \left( \sum_{j \neq i} W_{ij} a_j(h+1) + b_i > 0 \right)$$

$$a_i(h+1) = 0 \quad \left( \sum_{j \neq i} W_{ij} a_j(h+1) + b_i \leq 0 \right)$$

where $a_i(h)$ denotes the output status of the unit i at time h;

$W_{ij}$ denotes the coupling weight between the units i and j;

$b_i$ denotes the bias value of the unit i.

Instead of the time expansion equation shown in step S4, it is possible to adopt the equation based upon the chaos like zooming down method (disclosed in Japanese Patent Application Nos. 2-298984 and 2-414907 both filed by the same applicant, as follows:

$$m u_i + f(u_i, w_t) + K u_i = \epsilon \sum_{j \neq i} W_{ij} a_j + b_i$$

where $ü_i$ denotes the internal status of the unit i;
   $a_i$ denotes the output status of the unit i;-denote positive coefficients;
Sigmoid(x) denotes a Sigmoid function; and
   $f(ü_i, w_t)$ denotes the non-linear resistance of periodic vibration.

On the other hand, in the execution of pattern matching, there exists the case where the input pattern is distorted non-linearly relative to the standard pattern.

In the prior art neural network, in case the input pattern is distorted in a non-linear fashion, it has been impossible to execute an accurate pattern matching. In case of the present invention, however, it is possible to absorb the non-linear distortion by improving the restriction conditions of the coordinate associated network 14.

For brevity, a one-dimensional character pattern is taken into account herein. The assumption is made that the standard pattern is "a a a b b c c d" and the distorted input pattern is "a a b b c c c d". Then, the coordinate associated relationship between the two can be shown in FIG. 14.

In this case, the inflammation status points are not arranged in a straight line, but along a curved line corresponding to the distortion of the input pattern. This indicates that it is possible to reduce the curvature or deflection thereof by relaxing the network restriction condition. In practice, therefore, it is possible to reduce the curvature or deflection along the diagonal direction by providing the positive coupling for not only the units arranged in the diagonal direction, but also the units arranged on the opposing lines in the vicinity of the diagonal direction line.

Figures 14, 15:
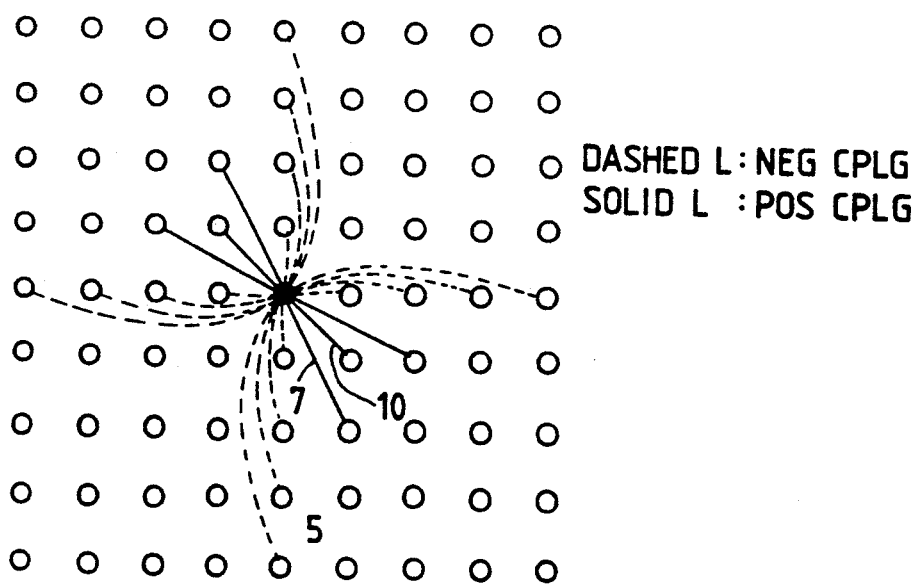
FIG. 14 is an illustration of the matching of an input pattern involving a non-linear expansion and contraction.
FIG. 15 is an illustration of the coupling status of one unit for executing the matching of an input pattern involving a non-linear expansion and contraction.

FIG. 15 shows a practical example of a unit coupling status which can reduce the distortion. In the figure, the solid lines indicate the positive couplings and the dashed lines indicate negative couplings. That is, the positive couplings are formed from Unit [i, j] to the following units:

Unit [i − 1, j − 1]
Uint [i − 1, j − 2]
Unit [i − 2, j − 1]
Unit [i + 1, j + 1]
Unit [i + 1, j + 2]
Unit [i + 2, j + 1]

Further, the negative couplings are formed from the Unit [i,−j] to the following units:

Unit [i, k] $1 \leq k \leq m, k = j$
Unit [k, j] $1 \leq k \leq m, k = i$
Unit [i + 1, j − 1]
Unit [i − 1, j + 1]

A practical example of character recognition will be described hereinbelow. The character recognition experiment of an image of 5×5 pixels was conducted by use of a neural network as shown in FIG. 16. Characters of L, T, and V were stored in the standard pattern associative memory network 12 as the standard patterns.

FIG. 17 shows the recognition process obtained when an input pattern T shifted by predetermined dots was inputted to the input pattern network 11 of the neural network constructed as described above. Further, in this experiment, the chaos-like zooming down method was adopted as the time expansion equation. As shown in FIGS. 17 (a) to (h), an associated character pattern appears on the standard pattern associative memory network 12 with a lapse of time, and further the matching status between the input pattern and the standard pattern also appears on the x-axis coordinate associated network 14a and the y-axis coordinate associated network 14b.

As shown in FIG. 17 (h), after the matching has been made, the inflammation points on the coordinate associated network 14 are arranged in two straight lines extending in the diagonal direction. The inflammation point on the uppermost line on the x-axis coordinate associated network shown in FIG. 17 (h) (the upper left side network) is located on the second column from the leftmost end column, and the inflammation point on the uppermost line on the y-axis coordinate associated network (the upper right side network) is located on the third column from the leftmost end column. This indicates that the input pattern on the input pattern network 11 is shifted from the standard position (the standard pattern position stored in the standard pattern associative memory network 12) by two pixels in the x-axis direction, and three pixels in the y-axis direction.

FIG. 18 shows a configuration of the neural network for experiment of recognition of an input pattern of 8 character string having non-linear type expansion and contraction and shifted by predetermined dots. The kinds of the characters are four, and the respective units corresponding to this 4-kind characters were arranged in the standard pattern associative memory network 12 and the input pattern network 11 in the vertical directions thereof. Further, three sets of symbol strings as "a a b c c d," "c c c c a d b b," and "b b b d d a a c" were stored in the standard pattern associative network 12 as the standard patterns. FIG. 18 shows the matching status where the input pattern of "b b d d a c b b" matches the standard pattern of "b b b d d a a c."

Further, FIG. 19 shows the status of time expansion, in which the input pattern of "d d a a a a b c" is being matched with the standard pattern of "a a a b c c d d". FIG. 19 (h) shows the status where the matching between the two is completed. In this case, it is understood that the inflammation points on the x-axis coordinate associated network 14a are straightly dislocated away from the straight line extending in the diagonal direction due to the non-linear expansion and contraction. As described above, it has become possible to determine the matching of a non-linear expansion and contraction pattern by accepting a slight dislocation or scattering of the inflammation points.

FIG. 20 shows the status where the energy varies with a lapse of time, which indicates that the energy is minimized at the time of matching (t=5,000).

As described above, in the neural network according to the present invention, since the association network is activated in response to the matching status between the input pattern and the standard pattern, it is possible to effect the pattern matching between the two even when the input pattern is shifted relative to the standard pattern. In addition, since the restriction condition for the coordinate associated network is so determined as to accept the matching distortion or deflection, it is possible to effect the pattern matching between an input pattern of non-linear expansion and contraction type and the standard pattern.

What is claimed is:

1. A neural network comprising:
    a standard pattern associative memory network for storing at least one standard pattern;
    an input pattern network for receiving any given input pattern;
    a coordinate associated network for storing a predetermined restriction condition; and
    an association network which receives as inputs signals from said standard pattern associative memory network, said input pattern network, and said coordinate associated network, respectively, and which becomes active in accordance with a matching status between the input pattern and the standard pattern.

2. A neural network according to claim 1, wherein, in response to the signals from the coordinate associated network, the association network becomes active when the standard pattern matches a deflected version of the input pattern.

* * * * *